(12) United States Patent
Oh et al.

(10) Patent No.: US 12,250,616 B2
(45) Date of Patent: Mar. 11, 2025

(54) ROAD SIDE UNIT FOR V2X SERVICE

(71) Applicant: LG ELECTRONICS INC., Seoul (KR)

(72) Inventors: Jiyoon Oh, Seoul (KR); Min Song, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

(21) Appl. No.: 17/776,879

(22) PCT Filed: Jun. 30, 2020

(86) PCT No.: PCT/KR2020/008509
§ 371 (c)(1),
(2) Date: May 13, 2022

(87) PCT Pub. No.: WO2022/004904
PCT Pub. Date: Jan. 6, 2022

(65) Prior Publication Data
US 2022/0345860 A1  Oct. 27, 2022

(51) Int. Cl.
*H04W 4/40* (2018.01)
(52) U.S. Cl.
CPC ................................. *H04W 4/40* (2018.02)
(58) Field of Classification Search
None
See application file for complete search history.

(56) References Cited

U.S. PATENT DOCUMENTS

| | | |
|---|---|---|
| 2013/0293394 A1 | 11/2013 | Rubin et al. |
| 2016/0285935 A1 | 9/2016 | Wu et al. |
| 2017/0330457 A1 | 11/2017 | Bhalla |
| 2019/0028862 A1* | 1/2019 | Futaki ............... H04W 4/44 |
| 2019/0323855 A1* | 10/2019 | Mahler ................ G01S 17/89 |
| 2020/0296709 A1* | 9/2020 | Martinez ............ H04L 69/14 |

FOREIGN PATENT DOCUMENTS

| | | |
|---|---|---|
| CN | 106507449 A | 3/2017 |
| CN | 108029001 A | 5/2018 |
| CN | 108140303 A | 6/2018 |
| CN | 109874123 A | 6/2019 |
| CN | 110769021 A | 2/2020 |
| CN | 110784328 A | 2/2020 |
| EP | 3 349 514 A1 | 7/2018 |
| KR | 10-1714250 B1 | 3/2017 |
| KR | 10-2017-0130428 A | 11/2017 |
| KR | 10-2018-0044992 A | 5/2018 |
| KR | 10-2018-0113624 A | 10/2018 |

(Continued)

*Primary Examiner* — Frantz Bataille
(74) *Attorney, Agent, or Firm* — Birch, Stewart, Kolasch & Birch, LLP

(57) ABSTRACT

A road side unit (RSU) device for vehicle-to-everything (V2X) service can transmit, to a V2X server, a message for configuring an RSU subscription area for a V2X service; receive, from the V2X server, at least one first V2X message published by at least one first V2X device associated with the RSU subscription area; and transmit, to a second V2X device within an RSU management area managed by the RSU device, a second V2X message based on the at least one received first V2X message.

8 Claims, 13 Drawing Sheets

(56) References Cited

FOREIGN PATENT DOCUMENTS

| KR | 10-2090498 B1 | 3/2020 |
| KR | 10-2103823 B1 | 4/2020 |
| WO | WO 2016/152097 A1 | 9/2016 |
| WO | WO 2017/176329 A1 | 10/2017 |
| WO | WO 2020/054812 A1 | 3/2020 |

\* cited by examiner

FIG. 1
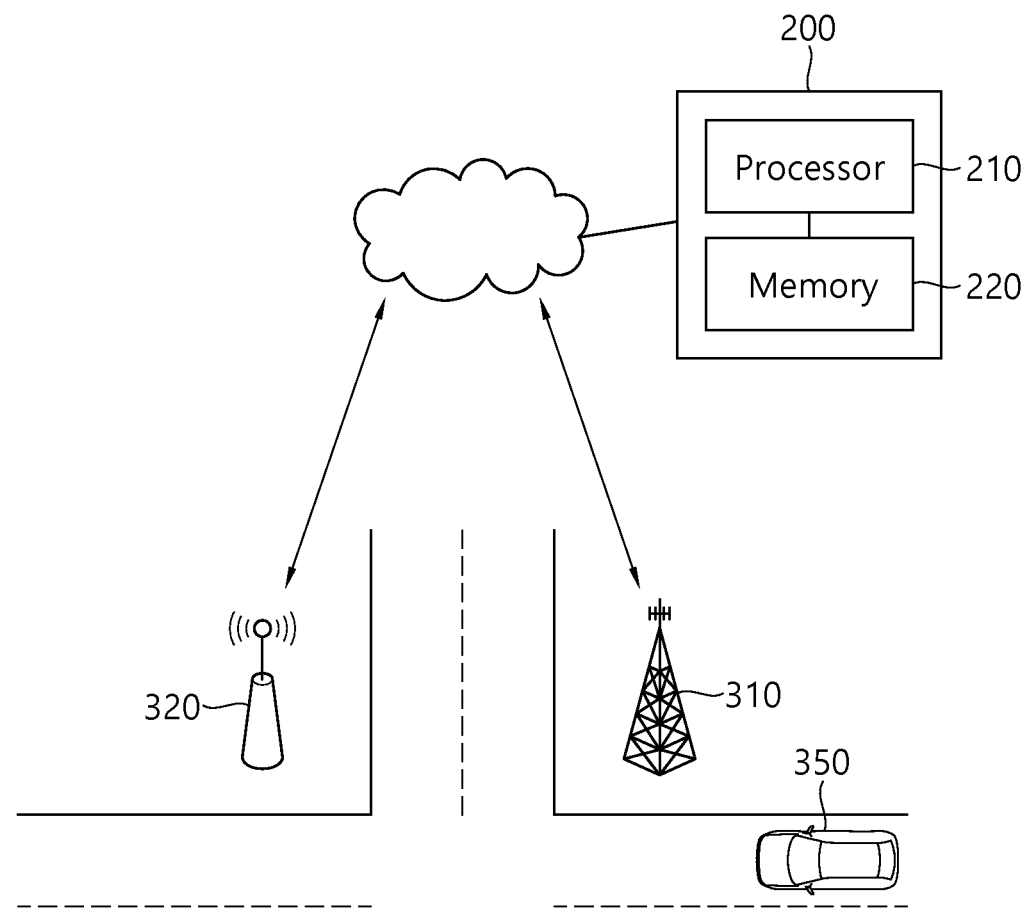
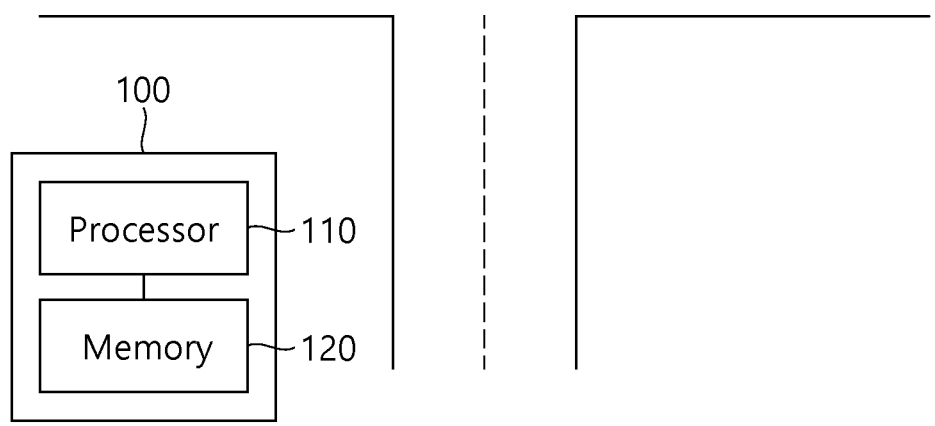

FIG. 3
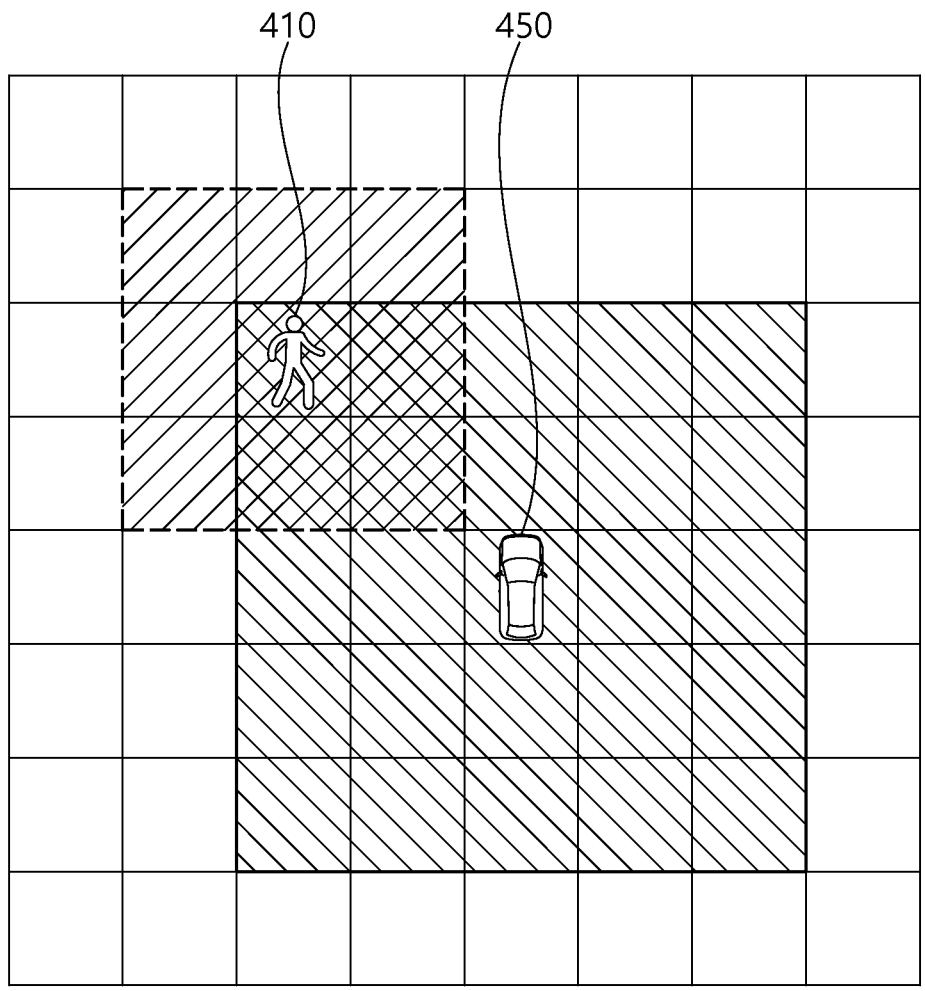
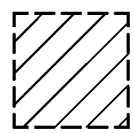 : First Subscription Area
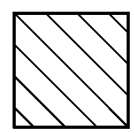 : Second Subscription Area

ROAD SIDE UNIT FOR V2X SERVICE

CROSS REFERENCE TO RELATED APPLICATIONS

This application is the National Stage filing under 35 U.S.C. 371 of International Application No. PCT/KR2020/008509, filed on Jun. 30, 2020, the contents of this application are hereby incorporated by reference herein in their entirety.

BACKGROUND OF THE DISCLOSURE

Field

The present disclosure relates to a method for vehicle-to-everything (V2X) service and a server using the same.

Related Art

A vehicle is an apparatus which moves a passenger from one place to another place. A representative example is a car. A vehicle-to-everything (V2X) communication technology, which means vehicle-to-object communication, refers to a technology in which the vehicle communicates with other vehicles, pedestrians, road infrastructures, servers, and the like to provide a series of services.

For the V2X, standardization organizations such as Institute of Electrical and Electronics Engineers (IEEE), 3rd Generation Partnership Project (3GPP), etc. provide various communication specifications. Dedicated Short Range Communications (DSRC) is the communication standard protocol based on IEEE 802.11p. Cellular-V2X (C-V2X) is the communication standard protocol based on cellular communication protocol of 3GPP. In general, V2X has focused on vehicle safety through direct communication between vehicles, but recently V2X includes vehicle-to-infrastructure communication for communicating with peripheral devices via a network.

A Road Side Unit (RSU) device refers to a device that is disposed along or on a road and operates as a gateway between V2X devices (e.g., vehicles, etc.) and infrastructure. The RSU device communicates with the V2X device through direct communication such as DSRC and C-V2X, and obtains traffic information, such as the speed or location of the V2X device and congestion information. RSUs can generally be placed on fixed objects located around the road, such as traffic lights and street lights.

Attempts are being made to extend V2X technology to be applied to pedestrians and other electronic devices, rather than simply being used for vehicle safety, such as vehicle-to-vehicle and vehicle-to-peripheral devices. Accordingly, the function of the RSU also needs to be expanded.

SUMMARY OF THE DISCLOSURE

The present disclosure provides relates to a road side unit (RSU) device for vehicle-to-everything (V2X) service.

In an aspect, an RSU device for V2X service includes a processor, and a memory operatively coupled with the processor and configured to store instructions that, when executed by the processor, cause the RSU device to perform functions. The functions include transmitting, to a V2X server, a message for configuring an RSU subscription area for a V2X service, receiving, from the V2X server, at least one first V2X message published by at least one first V2X device associated with the RSU subscription area, and transmitting, to a second V2X device within an RSU management area managed by the RSU device, a second V2X message obtained based on the at least one received first V2X message.

In another aspect, a non-transitory computer-readable medium having computer-readable instructions stored thereon that are executable by a processor to transmit, to a V2X server, a message for configuring a road side unit (RSU) subscription area for a V2X service, receive, from the V2X server, at least one first V2X message published by at least one first V2X device associated with the RSU subscription area, and transmit, to a second V2X device within an RSU management area managed by an RSU device, a second V2X message obtained based on the at least one received first V2X message.

It is possible to provide V2X services to more diverse users as well as vehicles and other devices.

BRIEF DESCRIPTION OF THE DRAWINGS

FIG. 1 shows a system to which an embodiment of the present specification is applied.

FIG. 3 shows an example in which a subscription area is set according to an embodiment of the present specification.

DETAILED DESCRIPTION OF THE EMBODIMENTS

Figure 2:
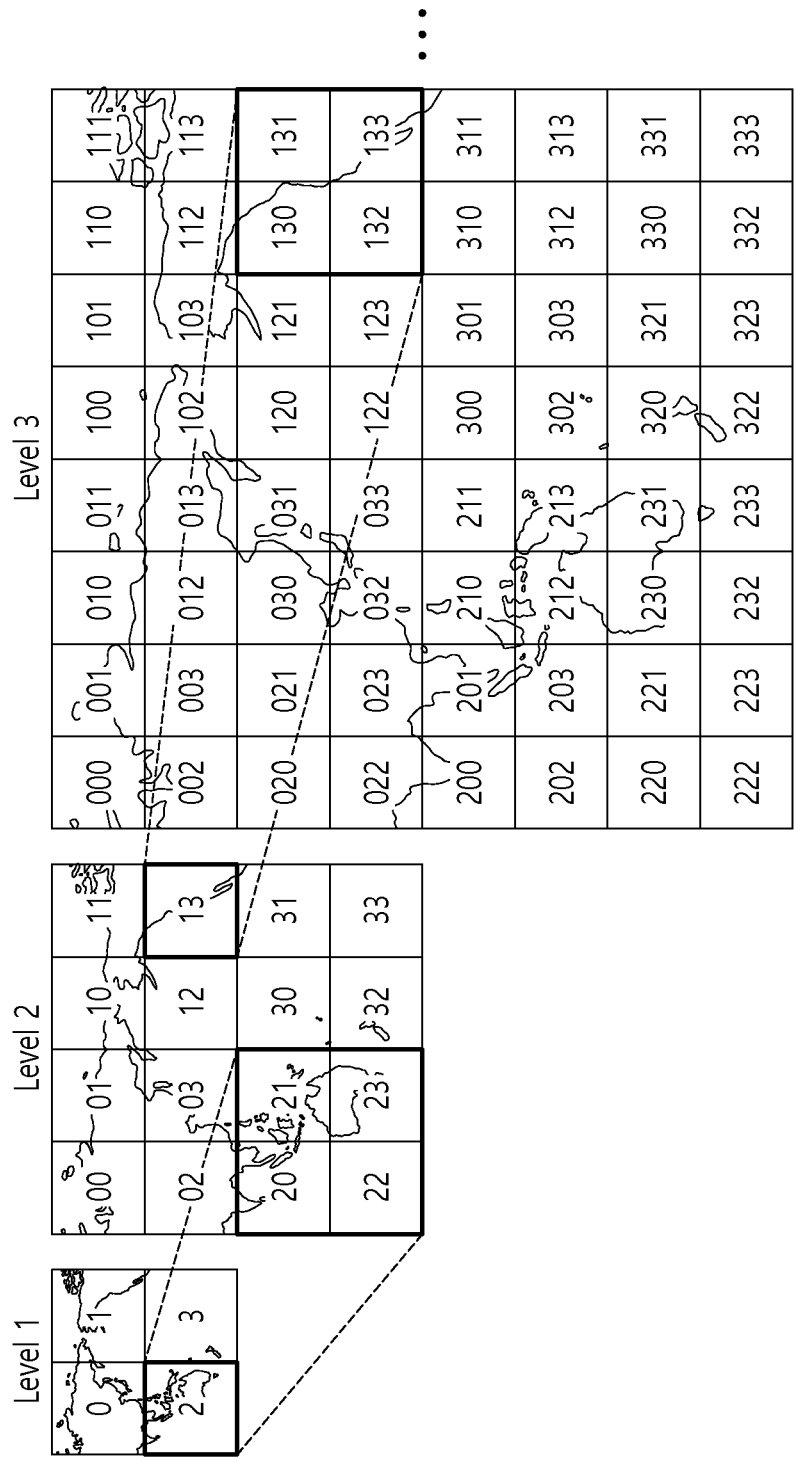
FIG. 2 shows an example of a tile using a quadtree according to an embodiment of the present specification.

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical ideas disclosed in the present specification are not limited by the accompanying drawings.

Terms including an ordinal number, such as first, second, etc., may be used to describe various elements, but the elements are not limited by the terms. The above terms are used only for the purpose of distinguishing one component from another.

When an element is referred to as being "connected" or "coupled" to another element, it is understood that it may be directly connected or coupled to the other element, but other elements may exist in between. On the other hand, when it is mentioned that a certain element is "directly connected" or "directly coupled" to another element, it should be understood that no other element is present in the middle.

The singular expression includes the plural expression unless the context clearly dictates otherwise.

In the present application, terms such as "comprises" or "have" are intended to designate that the features, numbers, steps, operations, components, parts, or combinations thereof described in the specification exist, but it is to be understood that this does not preclude the possibility of addition or existence of one or more other features, numbers, steps, operations, components, parts, or combinations thereof.

A vehicle according to an embodiment of the present specification can be defined as a means of transport traveling on a road or track. Vehicles may include automobiles, ships, aircraft, trains, motorcycles, bicycles, and the like. The vehicle may include an internal combustion engine vehicle having an engine as a power source, a hybrid vehicle having an engine and an electric motor as a power source, an electric vehicle having an electric motor as a power source, and combinations thereof.

A vehicle-to-everything (V2X) device according to an embodiment of the present specification refers to a device that provides V2X functions and V2X services to users based on software, and is also referred to as a SoftV2X device. The V2X device may be implemented based on hardware and/or software in an electronic device operated by a user such as User Equipment (UE), mobile station (MS), mobile terminal (MT), user terminal (UT), cellular phone, laptop, handheld device, tablet, drone, consumer electronics, and the like. The V2X device may be mounted on a vehicle or electronic device as an on-board unit (OBU) to provide V2X functions and services to the vehicle. A V2X device disposed inside or outside the vehicle may be connected to the vehicle through a wireless interface to provide V2X functions and V2X services to the vehicle.

FIG. 1 shows a system to which an embodiment of the present specification is applied.

A system includes a V2X device 100 and a V2X server 200. The V2X device 100 may communicate with the V2X server 200 through the base station 310 or a Road Side Unit (RSU) 320. The V2X device 100 may communicate with the base station 310, the RSU 320, a neighbor vehicle 350 and/or a neighbor V2X device using a wireless communication protocol. There is no limitation on the wireless communication protocol. The wireless communication protocol may include Dedicated Short Range Communications (DSRC), Cellular-V2X (C-V2X), WiFi, BLUETOOTH and/or cellular communication protocols based on 3rd Generation Partnership Project (3GPP) (e.g., Wideband Code Division Multiple Access (WCDMA), Long Term Evolution (LTE), New Radio (NR), etc.).

The V2X server 200 receives one or more V2X messages from the V2X device 100 within a managed area. The V2X server 200 may forward the one or more collected V2X messages to the subscribing V2X device 100.

The V2X message may periodically or aperiodically be transmitted to the V2X server 200 by the V2X device 100 (or RSU 320), and is a message providing status information of the V2X device 100 (or device managed by the RSU 320). For example, the V2X device 100 may transmit 10 V2X messages per second. The V2X server 200 collects V2X messages from multiple V2X devices, and forwards the V2X messages to subscribing V2X devices.

The following table shows examples of information elements included in the V2X message. Not all information elements are required, and names are examples only. Information elements may be added/changed/deleted according to policies or circumstances.

TABLE 1

| Name | Description |
| --- | --- |
| V2XID | A temporary identifier (ID) for identifying the V2X device sending this message. It is randomly selected by the V2X device and may be changed periodically. The size can be 4 octets. |
| Position | Indicates the location of the V2X device. May contain latitude, longitude and elevation. |
| Position Accuracy | Including the quality of various parameters used to model the accuracy of positioning. |
| Velocity | Indicates the velocity of the V2X device. |
| Heading | Indicates the current heading (direction of motion) of the V2X device. |
| Path History | defines a geometric path reflecting V2X device's movement over some period of time and/or distance |
| Acceleration | Indicates the acceleration of the V2X device. May include a set of acceleration values for three orthogonal directions of the V2X device: a longitudinal axis, a lateral axis, and a vertical axis. |
| Device Type | Indicates the type of V2X device. Example: pedestrian, automobile, bicycle, etc. |
| Publishing Area | To be described later |

The V2X message transmitted by the V2X device 100 to the V2X server 200 is called an uplink (UL) V2X message, and the V2X message transmitted by the V2X server 200 to the V2X device 100 is called a downlink (DL) V2X message.

The V2X device 100 may include a processor 110 and a memory 120. The processor 110 implements the functions of the V2X device 100 and may include one or more software modules. The V2X device 100 may further include various additional devices according to functions such as a display, a user interface, and a wireless modem.

The V2X server 200 is connected to one or more base stations 310 and/or RSU 320 and includes computing hardware that provides V2X functions and V2X services to the V2X device 100. The V2X server 200 may be a Mobile/Multi-access Edge Computing (MEC)-based server or a centralized-based server. The V2X server 200 may be called another name, such as a Geocast server or a SoftV2X server. The V2X server 200 may include a processor 210 and a memory 220. The processor 210 implements the function of the V2X server 200, and may include one or more software modules.

The processors 110 and 210 may include Application-Specific Integrated Circuits (ASICs), Central Processing Unit (CPU), Application Processor (AP), Digital Signal Processor (DSP), Digital Signal Processing Device (DSPD), Programmable Logic Device (PLD), Field Programmable Gate Array (FPGA), micro-controller, chipset, logic circuits, data processing device and/or combinations thereof. In the software implementation for the following embodiments, the software code for performing the functions described herein may be stored in the memories 120 and 220 and executed by the processors 110 and 210.

Memories 120 and 220 may store information accessible by processors 110 and 210. The information may include instructions executable by the processors 110 and 210 and/or data processed by the processor. Memories 120 and 220 may include any form of computer-readable medium operable to store information. For example, the memories 120 and 220 include read only memory (ROM), random access memory (RAM), digital video disc (DVD), optical disc, flash memory, solid state drive (SSD), hard drive and combinations thereof.

Message Queuing Telemetry Transport (MQTT) is used as a message queuing protocol between the V2X device 100 and the V2X server 200, but this is only an example. Advanced Message Queuing Protocol (AMQP), HyperText Transfer Protocol (HTTP), and/or vendor specific protocols may be used.

Now, setting an area for V2X service will be described in more detail. Hereinafter, a tile refers to a geographic basic unit for setting a subscription area. Hereinafter, a rectangle is shown in the form of a tile, but it is only an example. There are no restrictions on the shape of the tile, such as polygons or circles.

FIG. 2 shows an example of a tile using a quadtree.

The quadtree represents a partition of space in two dimensions by decomposing a map (i.e., world map) into four equal quadrants, subquadrants, and so on. The size of a quadrant varies according to a zoom level, and each quadrant corresponds to a tile. Here, the case where the levels are 1, 2, and 3 is shown. The larger the level, the smaller the size of the tile. At each level, a unique ID is assigned to a tile. The tile ID may have the number of bits corresponding to the level. For example, each internal node in the quadtree can have four children.

The V2X device may acquire the ID of the tile in which it is located based on its location information (e.g., latitude and longitude). The V2X device and/or the V2X server may adjust the size of the area by adjusting the level according to the situation.

In the following embodiment, the area for the V2X service is defined as follows.

Management area: The area managed by the V2X server. The management area includes one or more tiles.

Subscription area: The area where the V2X device requests a subscription to the V2X server. The subscription area may be referred to as another name, such as a concerned area, an impact area, or a geocast area. The subscription area contains one or more tiles. The subscription area may be included in one management area, and may be defined across a plurality of management areas managed by a plurality of V2X servers.

Publishing area: The area where the V2X device publishes V2X messages to the V2X server. The publishing area may include one tile in each level. The publishing area may indicate a tile where the V2X device is currently located. Some or all of the publishing area may overlap with the subscription area.

FIG. 3 shows an example in which a subscription area is set.

A first subscription area is set to the first V2X device 410 (e.g., the leftward sloping hashing around the person associated with first V2X device 410), and a second subscription area is set to the second V2X device 450 (e.g., the rightward sloping hashing around the vehicle associated with/corresponding to second V2X device 450). Each V2X device can set/change/delete the subscription area periodically or aperiodically (e.g., when its location is changed). Each V2X device can request setting/change/deletion of the subscription area to the V2X server.

In this example, number of tiles included in the first subscription area is 9 and the number of tiles included in the second subscription area is 25, but the number of tiles included in the subscription area or the shape of the subscription area is not limited. The subscription area may include a tile in which the V2X device is located. Alternatively, the subscription area may include one or more tiles other than a tile in which the V2X device is located.

The first V2X device 410 may generate a first V2X message and periodically send the first V2X message to the V2X server. The second V2X device 450 may generate a second V2X message and periodically send the second V2X message to the V2X server.

The V2X server may forward one or more V2X messages received in or around a subscription area to the V2X device related to the subscription area.

A device that sets a subscription area may be referred to as a "subscriber device." A device that transmits a V2X message to a V2X server can be referred to as a "provider device." A V2X device may be a subscriber device, a provider device, or both a subscriber device and a provider device. The V2X server may forward the V2X messages transmitted by the provider devices in the management area to the subscriber device.

The V2X server may deliver the V2X message of a provider device "associated" to the subscription area of a subscriber device to the subscriber device. A provider device associated with a subscription area of a subscriber device may be referred to as a "subscribed provider device." The provider device associated with the subscription area of the subscriber device may satisfy at least one of the following conditions (i) to (iii): (i) Part or all of the publishing area of the provider device overlaps with the subscription area of the subscriber device; (ii) some or all of the subscription area of the provider device overlaps the subscription area of the subscriber device; and/or (iii) The location where the provider device transmits the V2X message is within the subscription area of the subscriber device.

According to condition (i) or (iii), the V2X server delivers V2X messages received in the first subscription area to the first V2X device 410. The V2X server delivers V2X messages received in the second subscription area to the second V2X device 450.

Since the first V2X device 410 is located in the second subscription area, the V2X server may forward the first V2X message to the second V2X device 450. The second V2X device 450 is a subscriber device, and the first V2X device 410 is a subscribed provider device.

Since the second V2X device 450 is not located in the first subscription area (which means that condition (i) or condition (iii) is not satisfied), the V2X server does not forward the second V2X message to the first V2X device 410 (e.g., the person is in the vehicle's subscription area so the vehicle can receive V2X messages from the person, but the vehicle is not in the person's subscription area just yet so the person not receive V2X messages from the vehicle, according to some situations or configurations). In other words, different areas or zones can be set for the first V2X device 410 and second V2X device 450, so that the second V2X device 450 is aware of the first V2X device 410, but the first V2X device 410 not be aware of second V2X device 450, since the first V2X device 410 has a much smaller subscription area. The second V2X device 450 is not a provider device of the first V2X device 410. However, if condition (ii) is considered, the second V2X device 450 may be a provider device of the first V2X device 410 (e.g., even if conditions (i) and (iii) are not met, the server can be configured to still deliver a message from the second V2X device to the first V2X device when condition (ii) is met).

Figure 4:
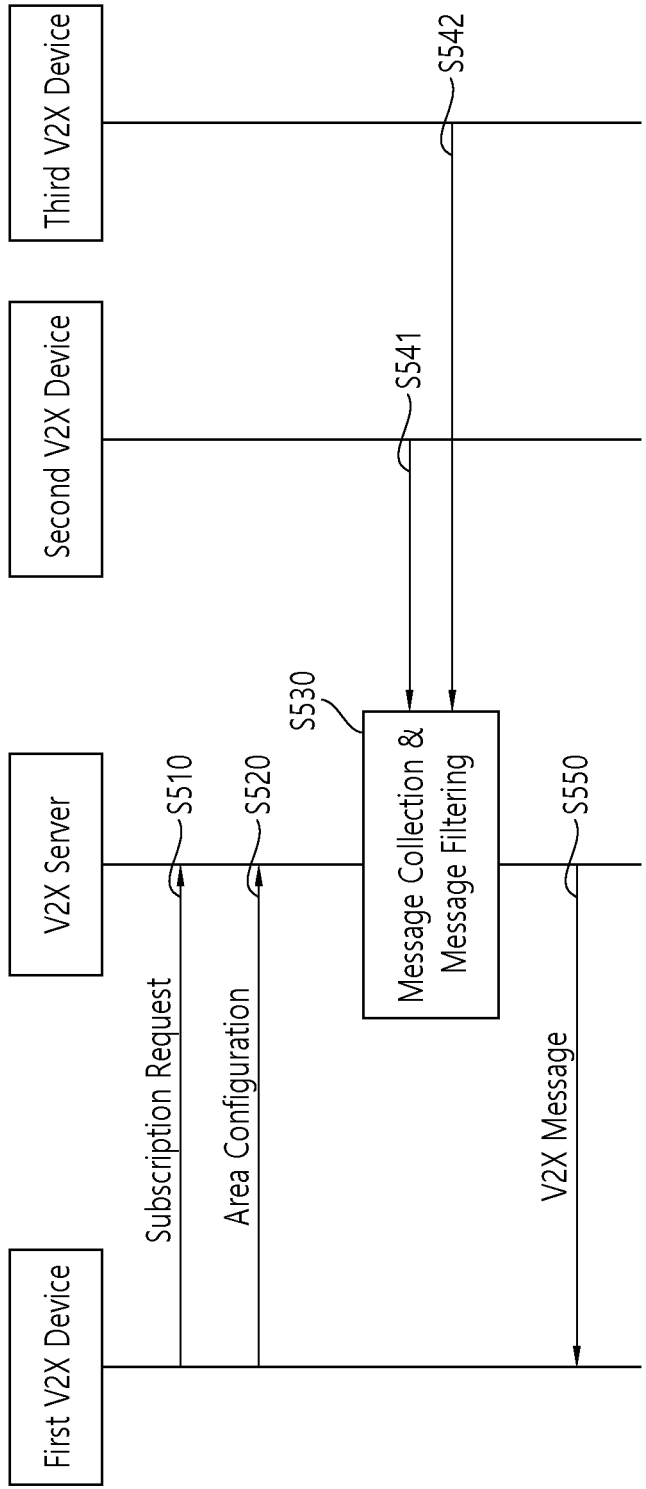
FIG. 4 is a flowchart illustrating a method for a V2X service according to an embodiment of the present specification.

FIG. 4 is a flowchart illustrating a method for a V2X service according to an embodiment of the present specification.

In step S510, a V2X device sends a subscription request for requesting subscription of the V2X service to a V2X server. The subscription request may include information about the identifier, location, etc. of the V2X device. The V2X server may transmit a subscription response for granting or rejecting subscription to the V2X device in response to the subscription request.

In step S520, the V2X device may send the area configuration related to the V2X service to the V2X server. The area configuration may be included in a separate message or included in the subscription request. The area configuration includes information about configuration and/or modification of the subscription area.

In step S530, the V2X server may collect V2X messages from V2X devices in the management area, and perform message filtering.

The V2X server receives the first V2X message from the second V2X device (step S541), and receives the second V2X message from the third V2X device (step S542). Assume that the second V2X device belongs to the subscription area of the first V2X device, but the third V2X device does not belong to the subscription area of the first V2X device.

In step S550, the V2X server publishes the first V2X message belonging to the subscription area of the first V2X device to the first V2X device. The first V2X device is a subscriber device and the second V2X device is a provider device. Since a V2X message of the third V2X device is not delivered to the first V2X device, the third V2X device is not a provider device of the first V2X device.

If there are a plurality of V2X messages to be sent to the first V2X device, the plurality of V2X messages may be published separately or as a single message.

Message filtering is that V2X server filters the V2X messages to be transmitted to V2X devices that have completed the subscription request. Message filtering may be referred to as a process of selecting a subscribed provider device associated with a subscriber device among a plurality of provider devices. Filtering conditions may be defined differently depending on the subscription area and/or the state of the V2X device. For example, if the number of V2X devices in the subscription area is large, the filtering conditions may be modified so that more messages are filtered out. Filtering condition may be related to the degree of risk of the V2X device.

Figure 5:
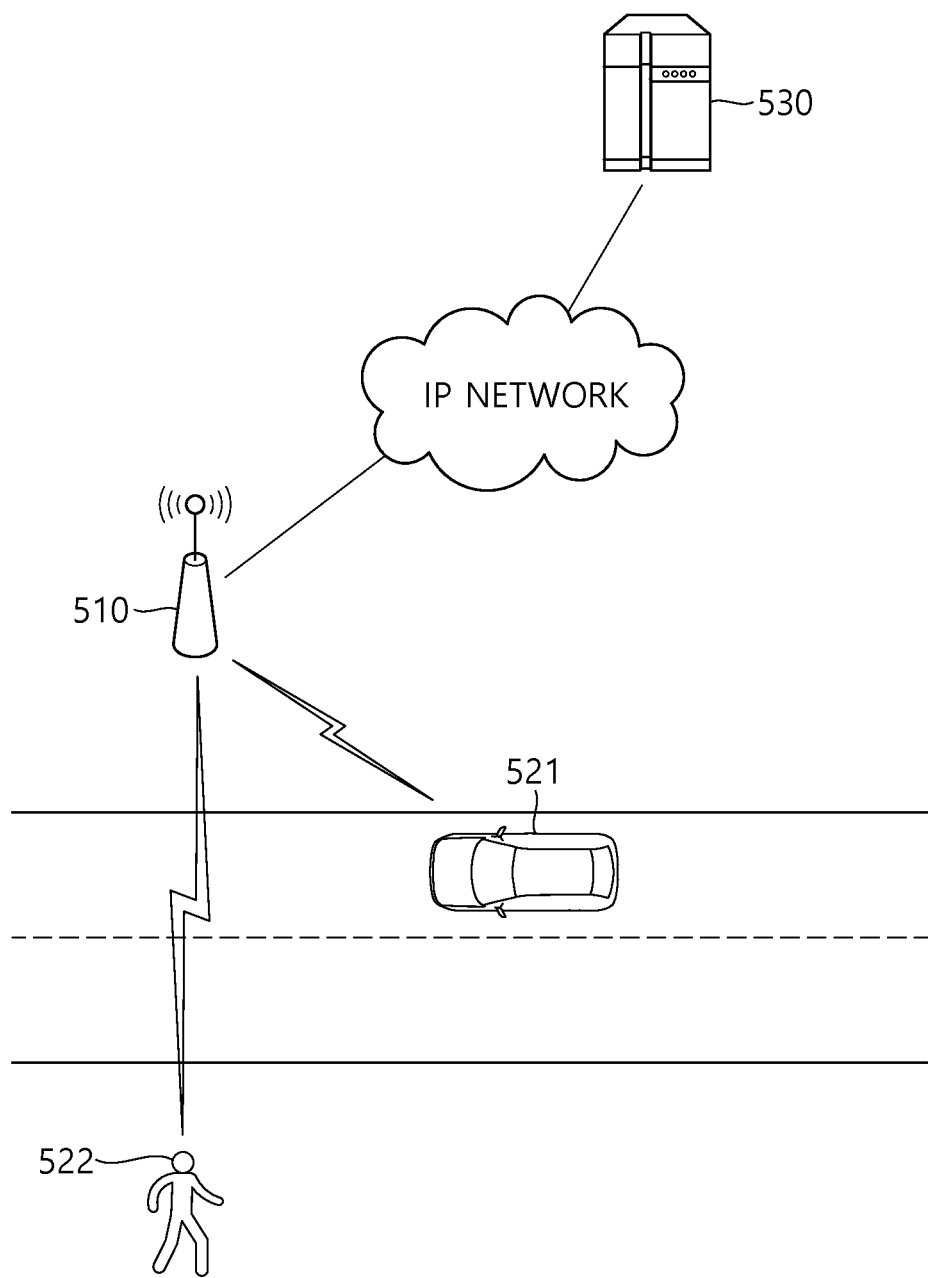
FIG. 5 shows the operation of a legacy RSU according to an embodiment of the present specification.

FIG. 5 shows the operation of a legacy RSU.

A legacy RSU 510 is disposed around a road, and can communicate with a vehicle 521 and a pedestrian 522 through a wireless medium based on a direct communication protocol (e.g., DSRC, C-V2X, etc.). A V2X device supporting only communication and/or device-to-device direct communication with the legacy RSU 510 is referred to as a legacy V2X device. The vehicle 521 and the pedestrian 522 are legacy V2X devices.

The legacy RSU 510 is connected to an Intelligent Transport System (ITS) server 530 through an internet protocol (IP) network to obtain traffic information such as road conditions and dangerous sections, or information received from legacy V2X devices to the ITS server 530. The ITS server 530 is a server that collects and provides traffic information, and may be referred to as a traffic control center, an ITS center, an application server, and the like.

The legacy RSU 510 may receive a message broadcast by the legacy V2X device, and may deliver this message to the ITS server 530.

In addition, the legacy RSU 510 may generate a Road Side Alert (RSA) message having traffic information obtained from the ITS server 530 and transmit the RSA message to the legacy V2X device. The legacy RSU 510 may transmit a MAP data message having geographic road information and a Signal Phase And Timing (SPAT) message having an intersection state to the legacy V2X device.

The legacy V2X device may transmit a Signal Request Message (SRM) for requesting priority at the intersection to the RSU 510. The legacy RSU 510 receiving the SRM may transmit a Signal Status Message (SSM), which is a response to the priority request, to the legacy V2X device.

The legacy RSU 510 may transmit a Probe Data Management (PDM) message having a list of information to be collected by the ITS server 530 to the legacy V2X device. The legacy V2X device that has received the PDM message may transmit a Probe Vehicle Data (PVD) message having the collected information to the legacy RSU 510. The legacy RSU 510 sends the collected information to the ITS server 530.

The legacy V2X device is provided with a V2X service using direct communication between devices or the legacy RSU 510. However, the V2X device according to the embodiment of the present specification is provided with a V2X service through communication with the V2X server. An RSU device that can operate with a V2X server is proposed.

Figure 6:
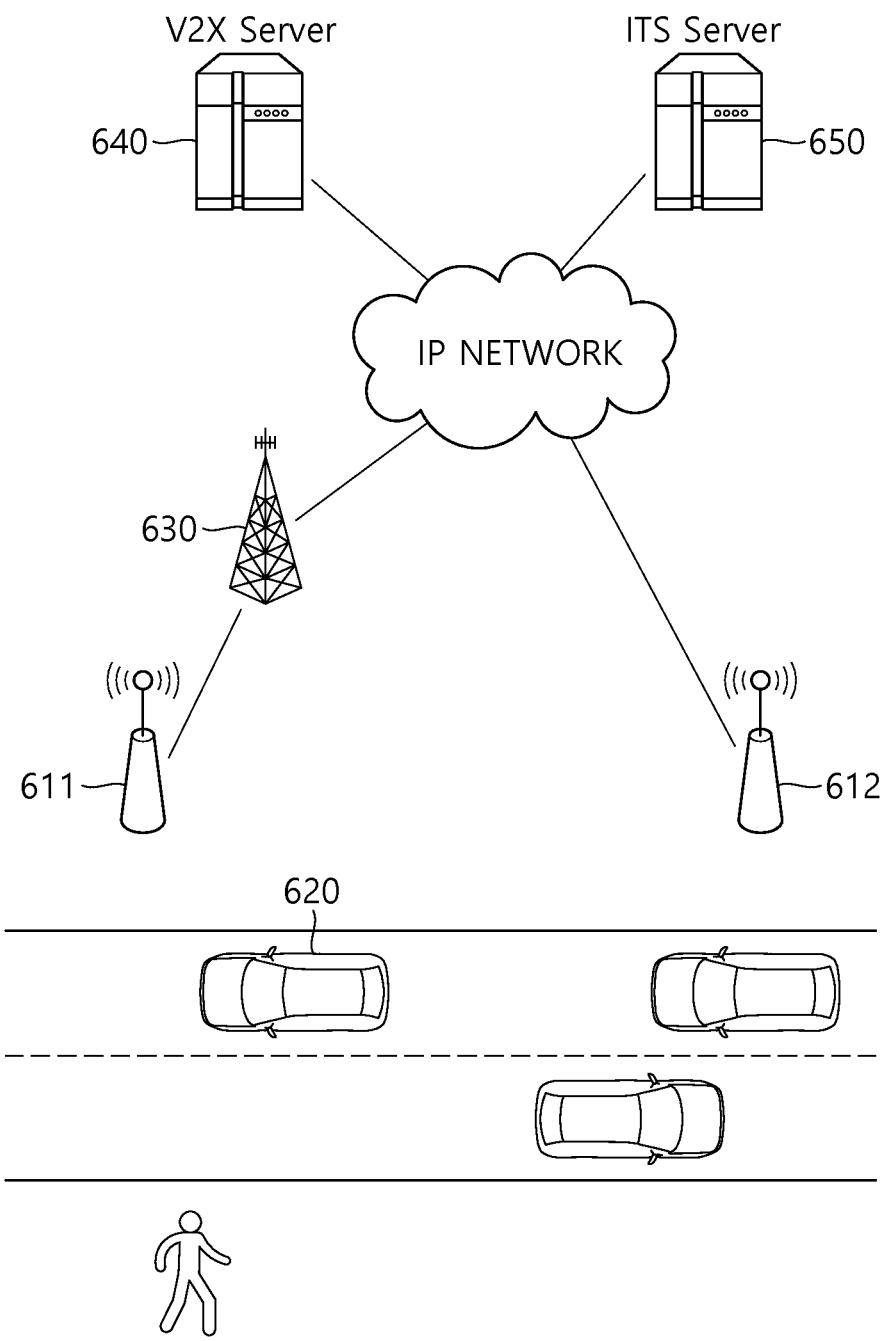
FIG. 6 shows the connection of the RSU for the V2X service according to an embodiment of the present specification.

FIG. 6 shows the connection of the RSU device for the V2X service according to an embodiment of the present specification.

A first RSU device 611 is connected to a V2X server 640 via an IP network through a cellular network using a base station 630. A second RSU device 612 is directly connected to the IP network, and is connected to the V2X server 640. The first RSU device 611 and the second RSU device 612 may also be connected to the ITS server 650. The V2X server 640 and the ITS server 650 are shown to be separated, but may be implemented by one or more servers. The ITS server 650 may receive information collected by the V2X server 640.

The RSUs 611 and 612 may be connected to the V2X server 640 and/or the V2X device 620 based on various wireless/wired communication protocols such as DSRC, C-V2X, cellular communication or a dedicated link. The RSUs 611 and 612 receive a message from the V2X server 640 through a wireless link or wired link such as ethernet, IP network, etc., and transmit a radio signal to the V2X device 620 through a wireless link such as DSRC, C-V2X, etc. The RSUs 611 and 612 may receive a message from the V2X device 620 via a wireless link, and deliver this message to the V2X server 640 via a wireless link or a wired link.

Although FIG. 6 shows that the RSUs 611 and 612 and the V2X server 640 are separated, this is only an example. The RSUs 611 and 612 and the V2X server 640 may be integrally implemented, or the RSUs 611 and 612 may perform some of the functions of the V2X server 640.

The RSUs 611 and 612 may include a memory and a processor. The memory may store information accessible by the processor. The information may include instructions executable by the processor and/or data processed by the processor. The RSUs 611 and 612 may further include a wireless modem for wireless link communication and a wired modem for wired link communication.

The RSUs 611 and 612 may receive various events through the V2X server 640 and broadcast to V2X devices. The event may include surrounding accidents, emergency vehicle access, road construction sections, weather-related information (e.g., poor visibility due to fog, road flooding, etc.), and the like. The RSUs 611 and 612 may receive various events through the ITS server 650 and transmit this event to the V2X server 640 or the V2X device. The RSUs 611 and 612 may receive events from V2X devices and provide them to the V2X server 640.

Figure 7:
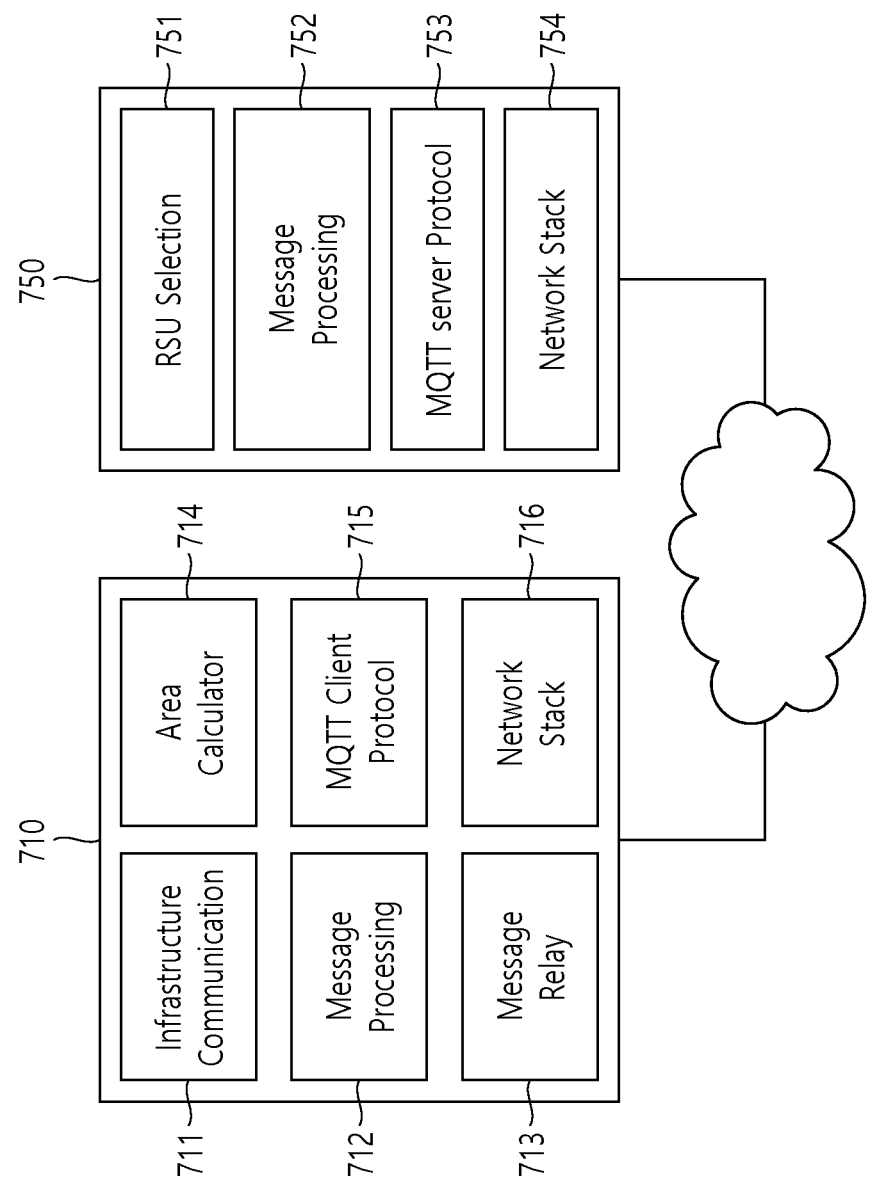
FIG. 7 shows an example of a software architecture between the RSU and the V2X server according to an embodiment of the present specification.

FIG. 7 shows an example of a software architecture between the RSU and the V2X server.

Each module may be implemented in software, stored in a memory, and executed by a processor. Not all modules are required. Some modules may be omitted or modified, and more modules may be added. The name of each module is merely an example, not a limitation.

An RSU 710 may include an infrastructure communication module 711, a message processing module 712, a message relay module 713, an area calculator 714, a Message Queuing Telemetry Transport (MQTT) client protocol module 715 and a network stack module 716.

The infrastructure communication module 711 may communicate with an infrastructure, such as an ITS server, to deliver the received message to the V2X device. The message processing module 712 receives and processes the message from the V2X device. The message processing module 712 generates and forwards a message to be delivered to a V2X server 750. The message processing module 712 receives a message from the V2X server 750, and delivers this message to the V2X device. The message relay module 713 determines whether to forward the message to the V2X device or the V2X server 750. The message relay module 713 may filter the received messages and deliver the filtered message to the V2X device or the V2X server 750. The area calculator 714 calculates the area for the operation of the RSU 710. The area calculator 714 may calculate the RSU subscription area for the RSU device 710. The area calculator 714 may calculate the publishing area for the legacy V2X device. The MQTT client protocol 715 implements the MQTT client protocol for communication with the V2X server 750.

The V2X server 750 may include an RSU selection module 751, a message processing module 752, an MQTT server protocol module 753, and a network stack module 756. The RSU selection module 751 selects an RSU device to which the message of the V2X device is to be delivered, from among a plurality of RSUs, based on the location/direction of the V2X device or other V2X devices. The message processing module 752 processes a message received from the RSU device 710 and/or the V2X device. The message processing module 752 may filter duplicated messages. The MQTT server protocol module 753 implements the MQTT server protocol.

The network stack modules 716 and 754 implement IP network interfaces such as transmission control protocol/internet protocol (TCP/IP), user datagram protocol/internet protocol (UDP/IP), etc.

MQTT is used as a message protocol, but this is only an example. Advanced Message Queuing Protocol (AMQP), HyperText Transfer Protocol (HTTP), and/or vendor specific protocols may be used.

An RSU management area refers to a geographic area managed by an RSU. The RSU management area may include an area to which a radio frequency (RF) signal of the RSU arrives. A V2X device located in the RSU management area may receive a message transmitted by the RSU.

The RSU subscription area is the area where the RSU device requests a subscription to the V2X server. An RSU subscription area may include one or more tiles. The RSU subscription area is defined by the RSU device and may be configured simultaneously with or separately from a subscription request. The RSU subscription area may be predefined for each RSU device by the V2X server. The RSU subscription area may overlap with the RSU management area, and there is no limitation in configuring these areas.

The V2X server may deliver the V2X message of a V2X device "associated" with the RSU subscription area to the RSU. The V2X device associated with the RSU subscription area may satisfy at least one of the following conditions (i) to (iii): (i) part or all of the publishing area of the V2X device overlaps with the RSU subscription area; (ii) part or all of the subscription area of the V2X device overlaps with the RSU subscription area; and (iii) the location where the V2X device transmits the V2X message is within the RSU subscription area.

Figure 8:
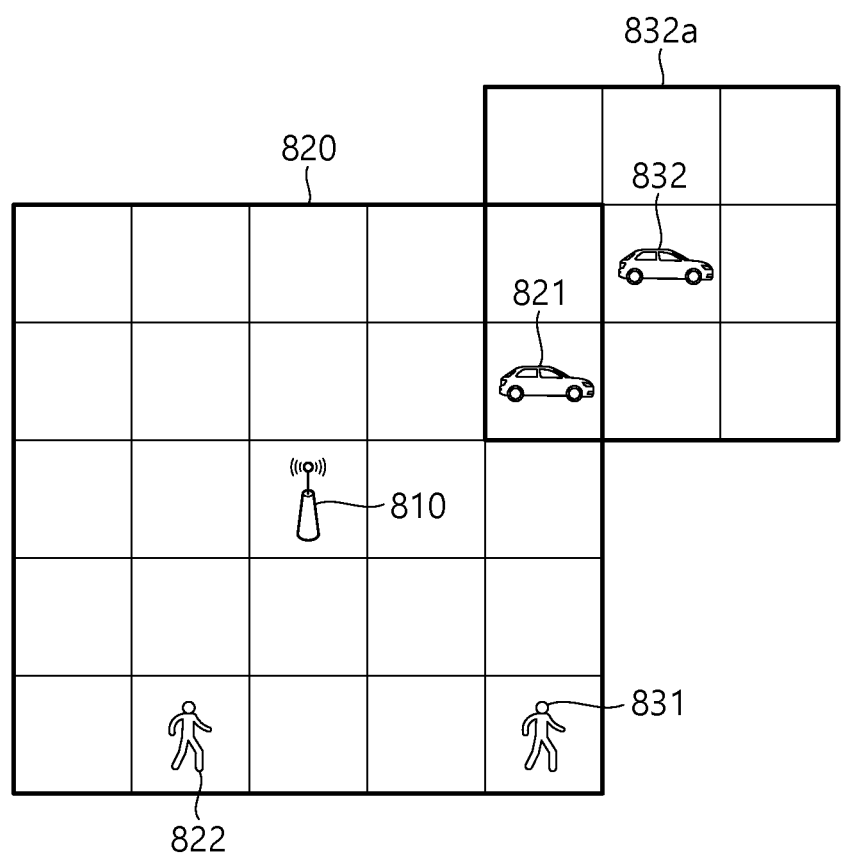
FIG. 8 shows an example of area setting for an RSU according to an embodiment of the present specification.

FIG. 8 shows an example of area setting for an RSU device.

An RSU 810 configures an RSU subscription area 820 and transmits information about the RSU subscription area 820 to a V2X server. The RSU device 810 may configure or change the RSU subscription area 820 based on the size of the RSU management area, a road type, a traffic volume, and the like.

In the RSU subscription area of the RSU device 810, there are a first legacy V2X device 821, a second legacy V2X device 822, and a first V2X device 831. A second V2X device 832 is placed outside the RSU subscription area of the RSU 810. The number or arrangement of V2X devices is only an example.

Hereinafter, the legacy V2X device refers to a device that communicates with the RSU based on a direct communication protocol, and a message exchanged between the legacy V2X device and the RSU device is referred to as a legacy V2X message. The direct communication protocol may include DSRC and C-V2X. A legacy V2X message is a broadcast message. This means that a device within a distance that the transmitting device's signal reaches can receive a legacy V2X message.

Table 2 below shows examples of information elements included in the legacy V2X message. Not all information elements are required, and names are examples only.

TABLE 2

| Name | Description |
| --- | --- |
| Temporary ID | An identifier randomly selected by the legacy V2X device. |
| Position | Indicates the location of the legacy V2X device. May contain latitude, longitude and elevation. |
| Velocity | Indicates the velocity of the legacy V2X device. |
| Heading | Indicates the current heading (direction of motion) of the legacy V2X device. |
| Traffic Information | Information about surrounding traffic conditions on the legacy V2X devices |
| Sensor Information | Information obtained from sensors such as LiDAR or CCTV |

A V2X device refers to a device that communicates with a V2X server based on a wireless communication protocol, and the message exchanged between the V2X device and the V2X server is called a V2X message. The V2X message is a message transmitted to a specific destination. This means that a V2X device which is not a destination device cannot receive the V2X message even when the V2X device is located within the transmitting distance of the device's signal. Examples of information included in the V2X message are shown in Table 1.

Legacy V2X messages and V2X messages are generated based on different communication protocols. Therefore, in order to deliver these messages, the RSU device and V2X server can perform the conversion from a legacy V2X message to a V2X message or from a V2X message to a legacy V2X message. For example, the RSU device can perform a proxy function between the legacy V2X devices and the V2X server (e.g., the RSU device can act as a proxy server).

The legacy V2X devices 821 and 822 may broadcast legacy V2X messages periodically or aperiodically. The RSU device 810 receives the broadcast V2X messages, and generates a V2X message based on the broadcast V2X messages. For example, the V2X message may be generated according to the MQTT protocol based on the legacy V2X message, and may further include additional information. The additional information may include information on the publishing area of the corresponding legacy V2X device. When a legacy V2X message is received from a legacy V2X device, the RSU device 810 calculates a publishing area based on the location of the legacy V2X device. The RSU device 810 transmits a V2X message with the calculated publishing area to the V2X server.

The V2X server may transmit a message to a subscriber device based on the received V2X message. Although the second V2X device 832 is not within the RSU subscription area 820, the publishing area of the first legacy V2X device 821 overlaps the subscription area 832a of the second V2X device 832. The V2X server transmits the V2X message obtained based on the legacy V2X message transmitted by the legacy V2X device 821 to the second V2X device 832.

The V2X message of the second legacy V2X device 822 is received by the RSU device 810 and delivered to the V2X server. However, the V2X server does not deliver the V2X message of the second legacy V2X device 822 to the second V2X device 832. This is because the second legacy V2X device 822 is not within the subscription area 832a of the second V2X device 832.

Conversely, the RSU device 810 may receive a V2X message transmitted by the second V2X device 832 through the V2X server. The V2X server that has received the V2X message transmitted by the second V2X device 832 delivers the V2X message to the RSU 810. This is because the RSU subscription area 820 overlaps with the subscription area 832a of the second V2X device 832. The RSU 810 may convert the received V2X message of the second V2X device 832 into a legacy V2X message, and broadcast the converted legacy V2X message to V2X devices within the RSU management area. That is, the legacy V2X devices 821 and 822 may receive the legacy V2X message generated based on the V2X message of the second V2X device 832.

When the RSU 810 receives one or more V2X messages from the V2X server, the RSU device 810 may determine whether to deliver the V2X message in consideration of the location/heading/speed of the provider device. The RSU device 810 can filter the received V2X messages, and may not deliver unnecessary messages. For example, if the provider device is traveling in a direction away from the RSU 810 at the boundary of the management area of the RSU 810, and the legacy V2X device is at a relatively long distance from the provider device, the RSU 810 may not deliver the received V2X message (e.g., since there is a low risk of collusion).

Figure 9:
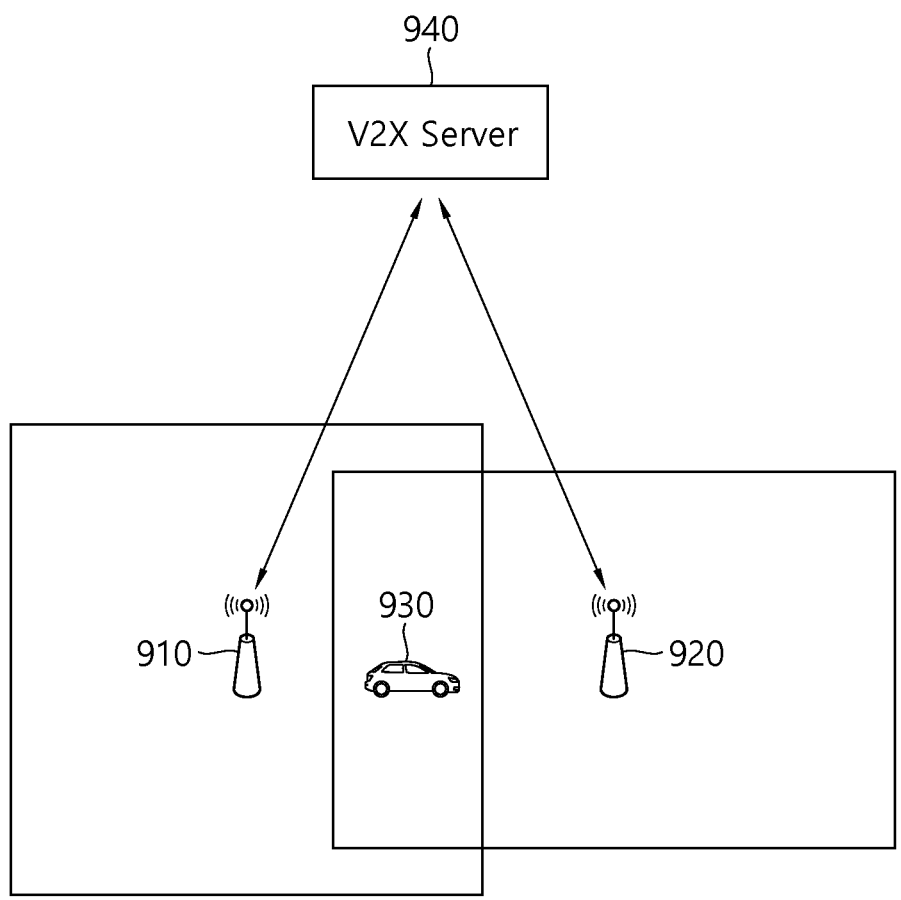
FIG. 9 shows an example of processing a duplicate message according to an embodiment of the present specification.

FIG. 9 shows an example of processing a duplicate message.

RSU management areas of a first RSU device 910 and a second RSU device 920 are overlapped with each other. A legacy V2X device 930 is located in the overlapping area. A legacy V2X message transmitted by the legacy V2X device 930 is received by both the first RSU device 910 and the second RSU device 920. The first RSU device 910 and the second RSU device 920 may generate a first V2X message and a second V2X message, respectively, based on the legacy V2X message, and transmit these V2X messages to a V2X server 940. Alternatively, at least one of the first RSU 910 and the second RSU 920 may forward the received legacy V2X message to the V2X server without a conversion process.

One of the first V2X message and the second V2X message may be referred to as a duplicate message. The V2X server 940 may determine whether the received message is a duplicate message. The V2X message may further include a message counter and/or a message sequence number. The V2X server 940 may determine whether the message is a duplicate message based on the V2X ID and the message counter (or message sequence number).

Figure 10:
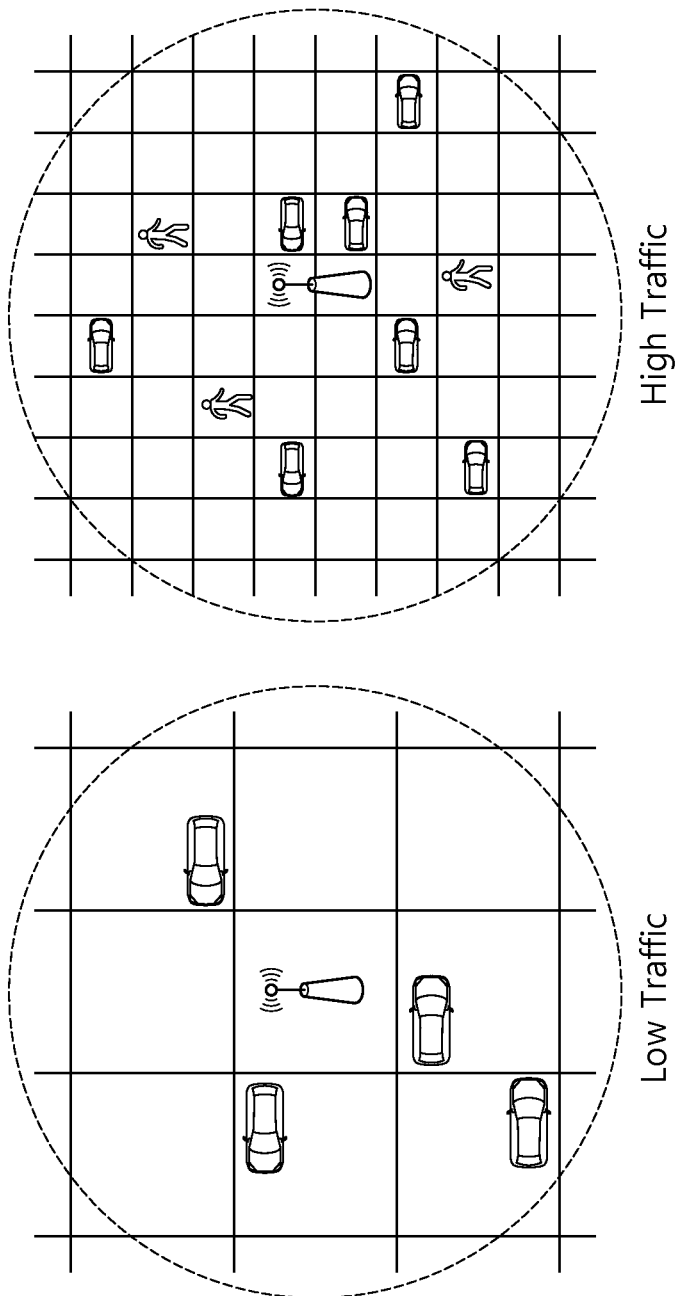
FIG. 10 shows an example of adjusting the size of a tile according to an embodiment of the present specification.

FIG. 10 shows an example of adjusting the size of a tile.

An RSU device can adjust the tile size according to the surrounding environment. Adjusting the tile size may include adjusting the size of the subscription area or adjusting the number of tiles included in the subscription area without changing the size of the subscription area. Also, adjusting the tile size may include adjusting the size of the publishing area or adjusting the number of tiles included in the presentation area without changing the size of the presentation area. The RSU device can adjust the tile size according to the surrounding environment, such as the speed of the V2X device, the traffic situation, the occurrence of an accident, etc. For example, in order to provide a more granular V2X service for each device, the tile size can be made smaller in a situation of high traffic than compared to a low traffic situation.

Figure 11:
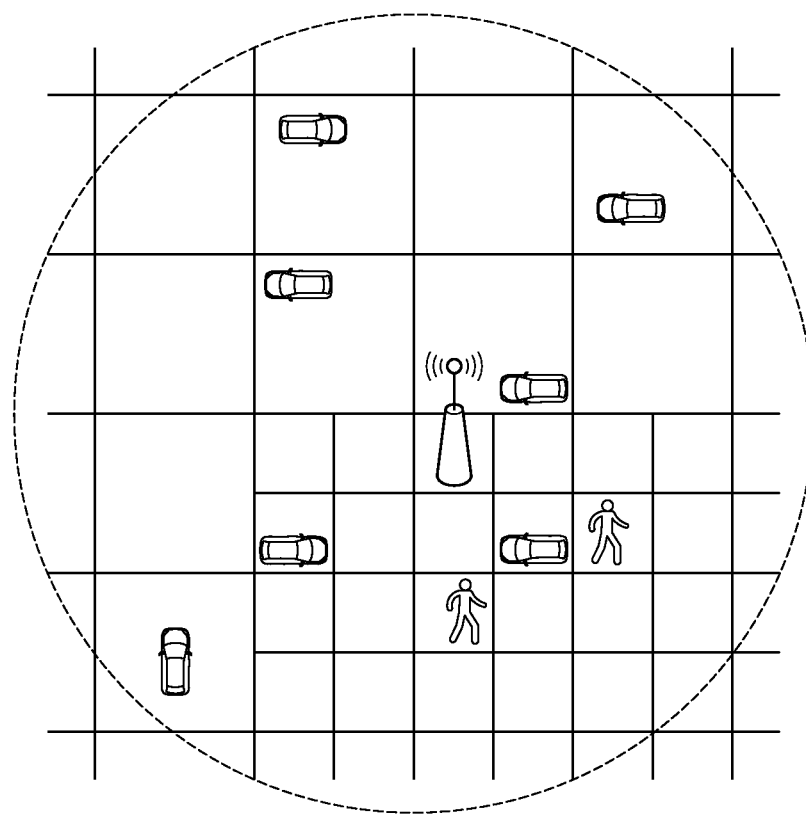
FIG. 11 shows another example of adjusting the tile size according to an embodiment of the present specification.

FIG. 11 shows another example of adjusting the tile size.

An RSU device may set tiles with different sizes within the RSU management area. The RSU can dynamically adjust the tile size for each V2X device or according to the surrounding environment of the V2X device. For example, one half (or other fraction) of the RSU management area can be configured to have smaller tiles than another half of the RSU management area.

Figure 12:
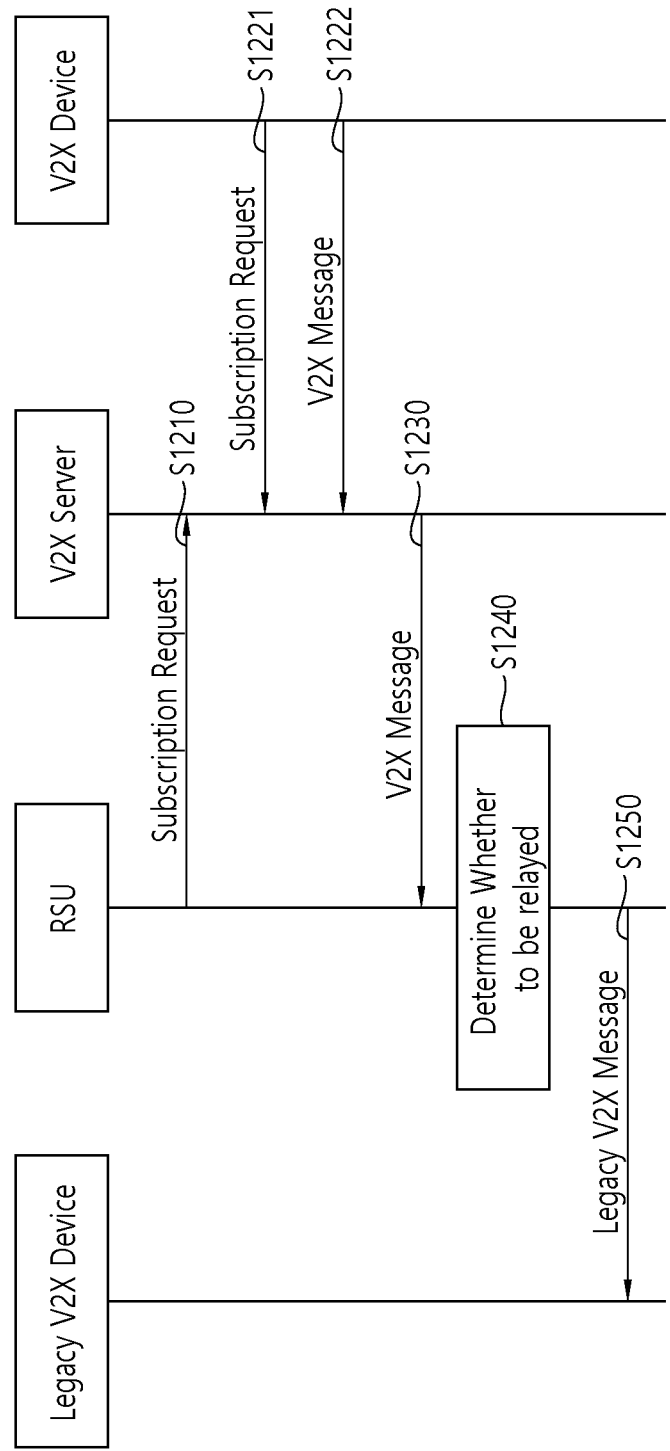
FIG. 12 shows an example of a message flow from a V2X device to a legacy V2X device according to an embodiment of the present specification.

FIG. 12 shows an example of a message flow from a V2X device to a legacy V2X device.

In step S1210, an RSU sends a subscription request to a V2X server, and sets an RSU subscription area.

In step S1221, a V2X device sends a subscription request to the V2X server, and sets the subscription area. In step S1222, the V2X device sends a V2X message to the V2X server.

In step S1230, if part or all of the RSU subscription area overlaps with the publishing area (and/or subscription area) of the V2X device, the V2X server delivers the V2X message to the RSU device.

In step S1240, the RSU device determines whether to relay the received V2X message. The RSU device may consider the speed/direction/position of the V2X device (e.g., as filtering conditions).

In step S1250, the RSU device converts the received V2X message into a legacy V2X message, and broadcasts the converted legacy V2X message. The legacy V2X device in the RSU management area may receive the broadcast legacy V2X message.

Here, the RSU device converts the V2X message to the legacy V2X message, but the V2X server may process the conversion and send the converted legacy V2X message to the RSU.

Even if the legacy V2X device does not subscribe to the V2X service, various V2X information can be provided through the RSU device.

Figure 13:
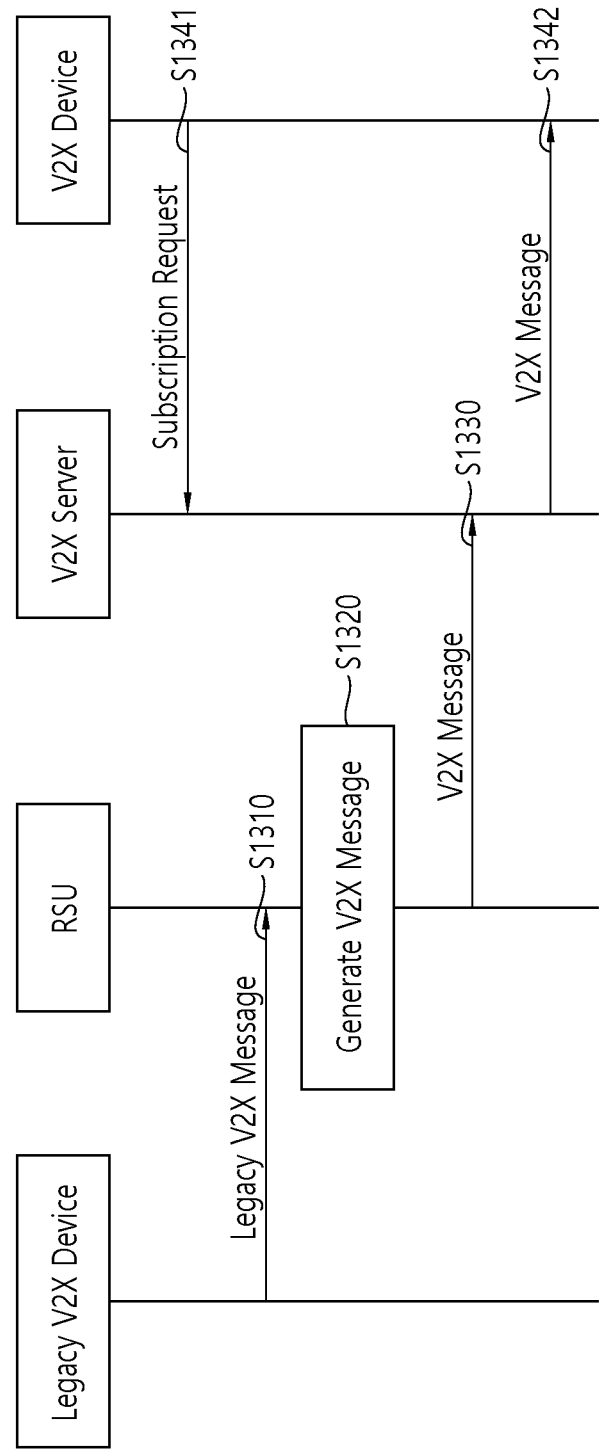
FIG. 13 shows an example of a message flow from a legacy V2X device to a V2X device according to an embodiment of the present specification.

FIG. 13 shows an example of a message flow from a legacy V2X device to a V2X device.

In step S1310, an RSU device receives a legacy V2X message from a legacy V2X device.

In step S1320, the RSU device generates a V2X message based on the legacy V2X message. The RSU device calculates the publishing area of the legacy V2X device, and information about the publishing area may be included in the V2X message.

In step S1330, the RSU device transmits a V2X message to a V2X server.

In step S1341, a V2X device sends a subscription request to the V2X server, and sets the subscription area.

In step S1342, the V2X server transmits the V2X message to the V2X device when the publishing area of the legacy V2X device overlaps with the subscription area of the V2X device. Accordingly, information of the legacy V2X device may be provided to the V2X device through the RSU device (e.g., the RSU device can function as a relay proxy).

Here, the RSU device converts the legacy V2X message to the V2X message, but the RSU device may deliver the legacy V2X message to the V2X server. The V2X server may process the conversion and send the converted V2X message to the V2X device.

In the above embodiments, the RSU device may receive an information message with traffic information from an ITS center. The RSU device may generate a legacy V2X message and/or a V2X message based on the received information message. The RSU device can send the generated V2X message to the V2X server and the RSU device can also send the generated V2X message to directly the V2X. For example, in this way, the RSU device can help the V2X server extend V2X services to V2X devices (e.g., devices located farther away from the range of the V2X server) and also to legacy V2X that may not be able to directly communicate with the V2X server.

In the above examples, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A road side unit (RSU) device for vehicle-to-everything (V2X) service, the RSU device comprising:
a processor; and
a memory operatively coupled with the processor and configured to store instructions that, when executed by the processor, cause the RSU device to perform functions comprising:
transmitting, to a V2X server, a message for configuring an RSU subscription area for a V2X service to request the V2X server to forward a first V2X message of a first V2X device when a publishing area of the first V2X device overlaps with the RSU subscription area, the publishing area of the first V2X device being an area in which the first V2X device transmits the first V2X message, wherein the first V2X device directly communicates with the V2X server based on a first communication protocol but does not communicate with the RSU device;
receiving, from the V2X server, the first V2X message published by the first V2X device associated with the RSU subscription area, wherein the first V2X message of the first V2X device is received by the V2X server and then is delivered by the V2X server to the RSU device, and a part or all of the RSU subscription area overlaps with the publishing area of the first V2X device;
converting the first V2X message conforming to the first communication protocol into a second V2X message conforming to a second communication protocol; and
transmitting, to a second V2X device, the second V2X message, wherein the second V2X device directly communicates with the RSU device based on the second communication protocol but does not communicate with the V2X server.

2. The RSU device of claim 1, wherein the first communication protocol is a communication protocol between the V2X server and the first V2X device, and the second communication protocol is a direct communication protocol between the RSU device and the second V2X device.

3. The RSU device of claim 1, wherein the first V2X message includes information on a publishing area of the first V2X device and a device type of the first V2X device, but the second V2X message does not include the information on the publishing area of the first V2X device and the device type of the first V2X device.

4. A non-transitory computer-readable medium having computer-readable instructions stored thereon that are executable by a processor to perform functions comprising:
   transmitting, to a vehicle-to-everything (V2X) server, a message for configuring a road side unit (RSU) subscription area of an RSU device for a V2X service to request the V2X server to forward a first V2X message of a first V2X device when a publishing area of the first V2X device overlaps with the RSU subscription area, the publishing area of the first V2X device being an area in which the first V2X device transmits the first V2X message, wherein the first V2X device directly communicates with the V2X server based on a first communication protocol but does not communicate with the RSU device;
   receiving, from the V2X server, the first V2X message published by the first V2X device associated with the RSU subscription area, wherein the first V2X message of the first V2X device is received by the V2X server and then is delivered by the V2X server to the RSU device, and a part or all of the RSU subscription area overlaps with the publishing area of the first V2X device;
   converting the first V2X message conforming to the first communication protocol into a second V2X message conforming to a second communication protocol; and
   transmitting, to a second V2X device, the second V2X message, wherein the second V2X device directly communicates with the RSU device based on the second communication protocol but does not communicate with the V2X server.

5. The non-transitory computer-readable medium of claim 4, wherein the first communication protocol is a communication protocol between the V2X server and the first V2X device, and the second communication protocol is a direct communication protocol between the RSU device and the second V2X device.

6. The non-transitory computer-readable medium of claim 4, wherein the first V2X message includes information on a publishing area of the first V2X device and a device type of the first V2X device, but the second V2X message does not include the information on the publishing area of the first V2X device and the device type of the first V2X device.

7. A road side unit (RSU) device for vehicle-to-everything (V2X) service, the RSU device comprising:
   a communication interface configured to transmit and receive messages with a V2X server and a plurality of legacy V2X devices; and
   a controller configured to:
      transmit, to the V2X server, a message for configuring an RSU subscription area for a V2X service to request the V2X server to forward a first V2X message of a V2X device when a publishing area of the V2X device overlaps with the RSU subscription area, the publishing area of the V2X device being an area in which the V2X device transmits the first V2X message, wherein the V2X device directly communicates with the V2X server based on a first communication protocol but does not communicate with the RSU device;
      receive, from the V2X server, the first V2X message published by the V2X device, wherein the first V2X message of the V2X device is received by the V2X server and then is delivered by the V2X server to the RSU, and a part or all of the RSU subscription area overlaps with the publishing area of the V2X device;
      convert the first V2X message from a first communication protocol into a second V2X message according to a second communication protocol different from the first communication protocol; and
      transmit the second V2X message to a legacy V2X device,
   wherein the legacy V2X device directly communicates with the RSU device based on the second communication protocol but does not communicate with the V2X server.

8. The RSU device of claim 7, wherein the first communication protocol is a communication protocol between the V2X server and the V2X device, and the second communication protocol is a direct communication protocol between the RSU device and the legacy V2X device.

* * * * *